(12) United States Patent
Wang

(10) Patent No.: US 12,513,348 B2
(45) Date of Patent: Dec. 30, 2025

(54) VIDEO RENDERING METHOD FOR LIVE BROADCAST SCENE, ELECTRONIC DEVICE AND STORAGE MEDIUM

(71) Applicant: Beijing Baidu Netcom Science Technology Co., Ltd., Beijing (CN)

(72) Inventor: Chenfei Wang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 16 days.

(21) Appl. No.: 18/747,082

(22) Filed: Jun. 18, 2024

(65) Prior Publication Data

US 2025/0193460 A1    Jun. 12, 2025

(30) Foreign Application Priority Data

Dec. 12, 2023 (CN) .......................... 202311708249.3

(51) Int. Cl.
*H04N 21/2187* (2011.01)
*G06T 17/00* (2006.01)
*G10L 15/26* (2006.01)

(52) U.S. Cl.
CPC ......... *H04N 21/2187* (2013.01); *G06T 17/00* (2013.01); *G10L 15/26* (2013.01)

(58) Field of Classification Search
CPC ...... H04N 21/2187; G06T 17/00; G10L 15/26
USPC ....................................................... 725/116
See application file for complete search history.

(56) References Cited

U.S. PATENT DOCUMENTS

2009/0216546 A1 * 8/2009 Huang ............... G06Q 30/0282
                                                  705/1.1

FOREIGN PATENT DOCUMENTS

| CN | 106656767 | A |   | 5/2017  |           |
|----|-----------|---|---|---------|-----------|
| CN | 107423809 | A |   | 12/2017 |           |
| CN | 108416286 |   | * | 8/2018  | G06F 17/27 |
| CN | 108416286 | A |   | 8/2018  |           |
| CN | 113421143 | A |   | 9/2021  |           |
| CN | 116756285 | A |   | 9/2023  |           |
| KR | 101436413 | B1|   | 9/2014  |           |

OTHER PUBLICATIONS

China National Intellectual Property Administration; Chinese Application No. 202311708249.3; Notice of First Examination Opinion; 25 pages; dated Jan. 20, 2025.

* cited by examiner

*Primary Examiner* — Nnenna N Ekpo
(74) *Attorney, Agent, or Firm* — Faegre Drinker Biddle & Reath LLP

(57) ABSTRACT

Provided is a video rendering method for a live broadcast scene, relating to the field of live broadcast and the field of large model. The method includes: recording a live broadcast of an anchor to obtain a first video stream; performing speech recognition on live speech in the first video stream to obtain first text information; determining topic popularity of the live broadcast based on audience response information in a process of recording the live broadcast and the first text information; determining corresponding reply text information based on the first text information when the topic popularity of the live broadcast meets a first set condition; rendering virtual characters based on the reply text information to obtain a second video stream; and generating a third video stream of the anchor chatting with the virtual characters based on the first video stream and the second video stream.

20 Claims, 7 Drawing Sheets

VIDEO RENDERING METHOD FOR LIVE BROADCAST SCENE, ELECTRONIC DEVICE AND STORAGE MEDIUM

CROSS-REFERENCE TO RELATED APPLICATIONS

The present application claims the priority from Chinese Patent Application No. 202311708249.3, filed with the Chinese Patent Office on Dec. 12, 2023, the content of which is hereby incorporated herein by reference in its entirety.

TECHNICAL FIELD

The present disclosure relates to the field of artificial intelligence technology, and in particular to the field of live broadcast and the field of large model. The present disclosure specifically relates to a video rendering method and apparatus for a live broadcast scene, an electronic device and a storage medium.

BACKGROUND

In a live broadcast scene, for example, when an anchor is selling a product or chatting with other anchors or audiences, it is sometimes easy for the anchor to have a single topic and find it difficult to chat with the audiences or other anchors. If this situation continues for such a long time, the live broadcast effect will be affected, and the experience of other anchors and audiences will be affected.

SUMMARY

The present disclosure provides a video rendering method and apparatus for a live broadcast scene, an electronic device and a storage medium.

According to one aspect of the present disclosure, provided is a video rendering method for a live broadcast scene, including:
  recording a live broadcast of an anchor to obtain a first video stream;
  performing speech recognition on live speech in the first video stream to obtain first text information;
  determining topic popularity of the live broadcast based on audience response information in a process of recording the live broadcast and the first text information;
  determining corresponding reply text information based on the first text information when the topic popularity of the live broadcast meets a first set condition;
  rendering virtual characters based on the reply text information to obtain a second video stream; and
  generating a third video stream of the anchor chatting with the virtual characters based on the first video stream and the second video stream.

According to another aspect of the present disclosure, provided is a live broadcast apparatus, including:
  a video recording module configured to record a live broadcast of an anchor to obtain a first video stream;
  a speech recognition module configured to perform speech recognition on live speech in the first video stream to obtain first text information;
  a popularity determining module configured to determine topic popularity of the live broadcast based on audience response information in a process of recording the live broadcast and the first text information;
  a reply text determining module configured to determine corresponding reply text information based on the first text information when the topic popularity of the live broadcast meets a first set condition;
  a virtual character rendering module configured to render virtual characters based on the reply text information to obtain a second video stream; and
  a video generation module configured to generate a third video stream of the anchor chatting with the virtual characters based on the first video stream and the second video stream.

According to yet another aspect of the present disclosure, provided is an electronic device, including:
  at least one processor; and
  a memory connected in communication with the at least one processor;
  where the memory stores an instruction executable by the at least one processor, and the instruction, when executed by the at least one processor, enables the at least one processor to execute the video rendering method for the live broadcast scene of any one of the embodiments of the present disclosure.

According to yet another aspect of the present disclosure, provided is a non-transitory computer-readable storage medium storing a computer instruction thereon, and the computer instruction is used to cause a computer to execute the video rendering method for the live broadcast scene according to any one of the embodiments of the present disclosure.

According to yet another aspect of the present disclosure, provided is a computer program product including a computer program, and the computer program implements the video rendering method for the live broadcast scene according to any one of the embodiments of the present disclosure, when executed by a processor.

According to the technology of the present disclosure, the virtual characters are set for the anchor in the live broadcast room, the speech recognition is performed on the live speech of the anchor to obtain the first text information, and then the topic popularity of the live broadcast can be determined based on the audience response information and the first text information. When determining that the anchor has nothing to talk about through the topic popularity of the live broadcast, the first text information is used to determine the corresponding reply text information, and the reply text information is used to render the virtual characters to obtain the second video stream; and the first video stream obtained by recording the live broadcast of the anchor is mixed with the second video stream to generate the third video stream of the anchor chatting with the virtual characters, thereby realizing a live broadcast scene in which the virtual characters interact on topics with the anchor. In this way, when the anchor has nothing to talk about, the virtual character can find topics to chat with the anchor, to liven up the atmosphere of the live broadcast room and increase the topic popularity of the live broadcast.

It should be understood that the content described in this part is not intended to identify critical or essential features of embodiments of the present disclosure, nor is it used to limit the scope of the present disclosure. Other features of the present disclosure will be easily understood through the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to exemplary embodiments of the present disclosure are made with reference to the accompanying drawings, include various details of the embodiments of the present disclosure to facilitate understanding, and should be considered as merely exemplary. Therefore, those having ordinary skill in the art should realize, various changes and modifications may be made to the embodiments described herein, without departing from the scope of the present disclosure. Likewise, for clarity and conciseness, descriptions of well-known functions and structures are omitted in the following descriptions.

Figure 1:
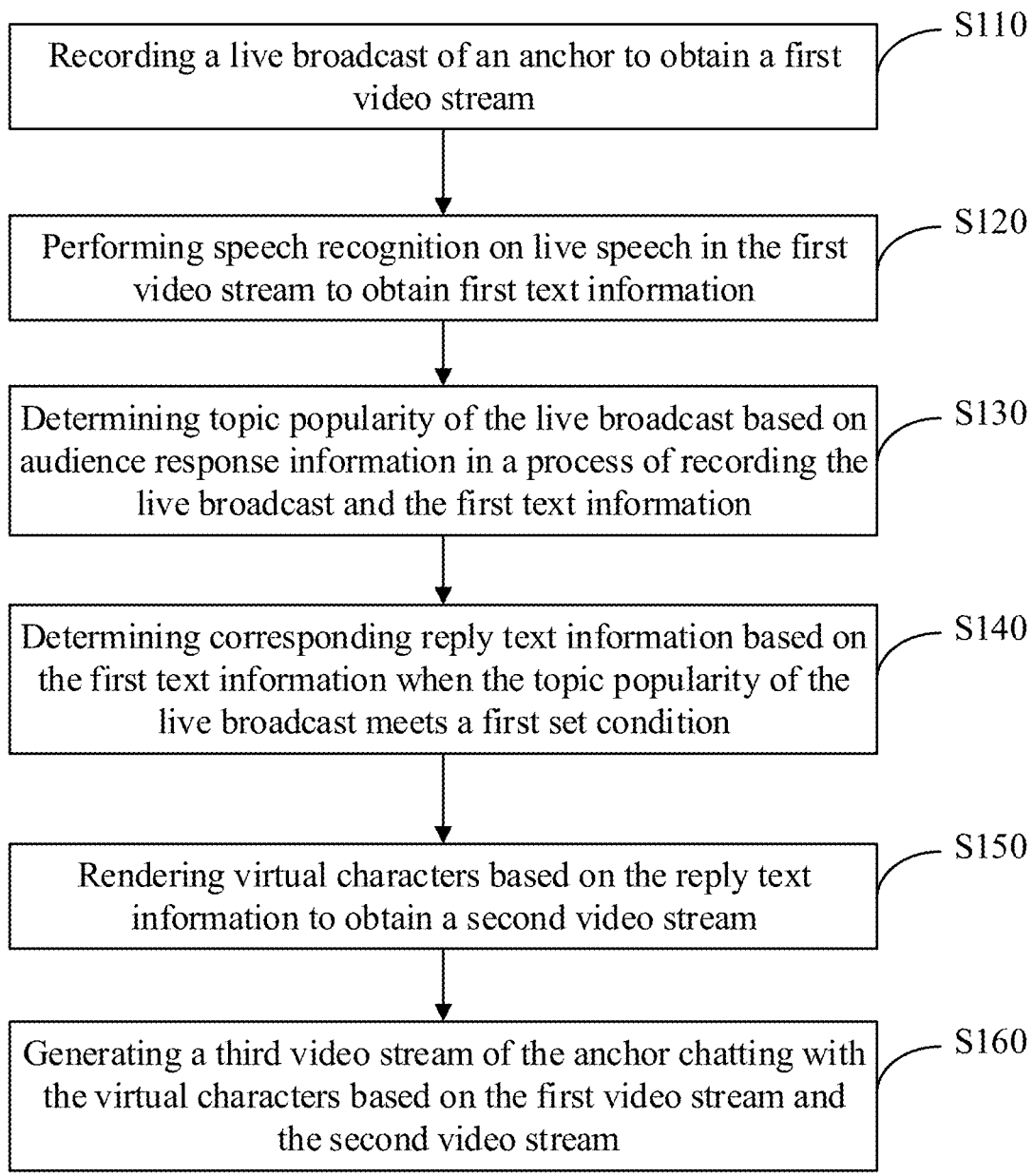
FIG. 1 is a flow chart of a video rendering method for a live broadcast scene according to an embodiment of the present disclosure.

FIG. 1 is a flow chart of a video rendering method for a live broadcast scene according to an embodiment of the present disclosure. This method can be applied to an electronic device. The electronic device is, for example, a terminal, a server or other processing device. Here, the terminal may be a User Equipment (UE) such as a desktop computer, a mobile device, a PDA (Personal Digital Assistant), a handheld device, a computing device, a vehicle-mounted device, a wearable device, etc. In some implementations, the electronic device may implement the video rendering method for the live broadcast scene in the embodiment of the present disclosure by calling a computer-readable instruction stored in a memory through a processor.

As shown in FIG. 1, the video rendering method for the live broadcast scene may include:

S110: recording a live broadcast of an anchor to obtain a first video stream;

S120: performing speech recognition on live speech in the first video stream to obtain first text information;

S130: determining topic popularity of the live broadcast based on audience response information in a process of recording the live broadcast and the first text information;

S140: determining corresponding reply text information based on the first text information when the topic popularity of the live broadcast meets a first set condition;

S150: rendering virtual characters based on the reply text information to obtain a second video stream; and S160: generating a third video stream of the anchor chatting with the virtual characters based on the first video stream and the second video stream.

It can be understood that the video rendering method for the live broadcast scene in the embodiment of the present disclosure can be executed by a local stream pushing device; or the local stream pushing device can record the live broadcast and upload it to the cloud, the cloud executes the above steps S120 to S160 and returns the third video stream to the stream pushing device, and the stream pushing device pushes the third video stream to each client for playing. For example, the video streams are distributed through CDN.

It can be understood that the step of recording the live broadcast of the anchor includes: using a microphone to receive the anchor's speech information, and using a camera to capture a live broadcast room centered on the anchor to obtain a video image, thereby obtaining the first video stream. The first video stream includes multimedia data of video and speech.

It can be understood that the live speech is the speech information from the anchor.

It can be understood that the live speech is recognized by using the Automatic Speech Recognition (ASR) technology to obtain the first text information.

It can be understood that the audience response information may include audience comment information in the comment area, and reply information of other anchors or audiences chatting by microphone with the anchor (the reply information is obtained by recognizing the reply voices of other anchors or audiences).

It can be understood that the virtual character may be a virtual character with a specific style. For example, the anchor selects a virtual character with a first style in a style selection interface, uses the model data of the virtual character with the first style to start rendering, and obtains an initial video stream of the virtual character of the first network, where the initial video stream includes an initial picture and an initial voice.

It can be understood that the virtual character in the initial video stream is rendered based on the reply text information, to obtain the second video stream. For example, the reply text information is used to determine the corresponding lip shape data and body movement data, and the lip shape data and body movement data are used to adjust the lip shape and body movement of the virtual character in the initial video stream, so that the lip shape of the virtual character matches with the lip shape in the lip shape data, and the body movement of the virtual character matches with the body movement in the body movement data.

It can be understood that the first video stream and the second video stream are mixed to obtain the third video stream. For example, the stream mixing process includes inserting a video frame in the second video stream into the first video stream as a video frame in the first video stream, or merging a video frame in the second video stream and a video frame in the first video stream into a same frame. For another example, the stream mixing process may also include deleting some frames in the first video stream and deleting some frames in the second video stream.

Figure 2:
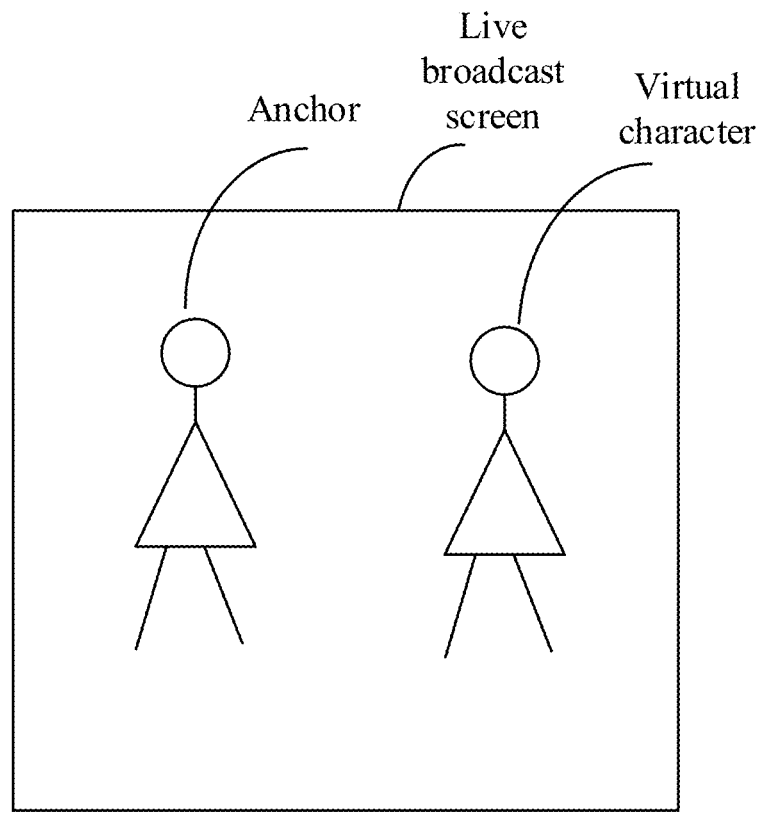
FIG. 2 is a scene diagram of a chat between an anchor and a virtual character according to an embodiment of the present disclosure.
Figure 3:
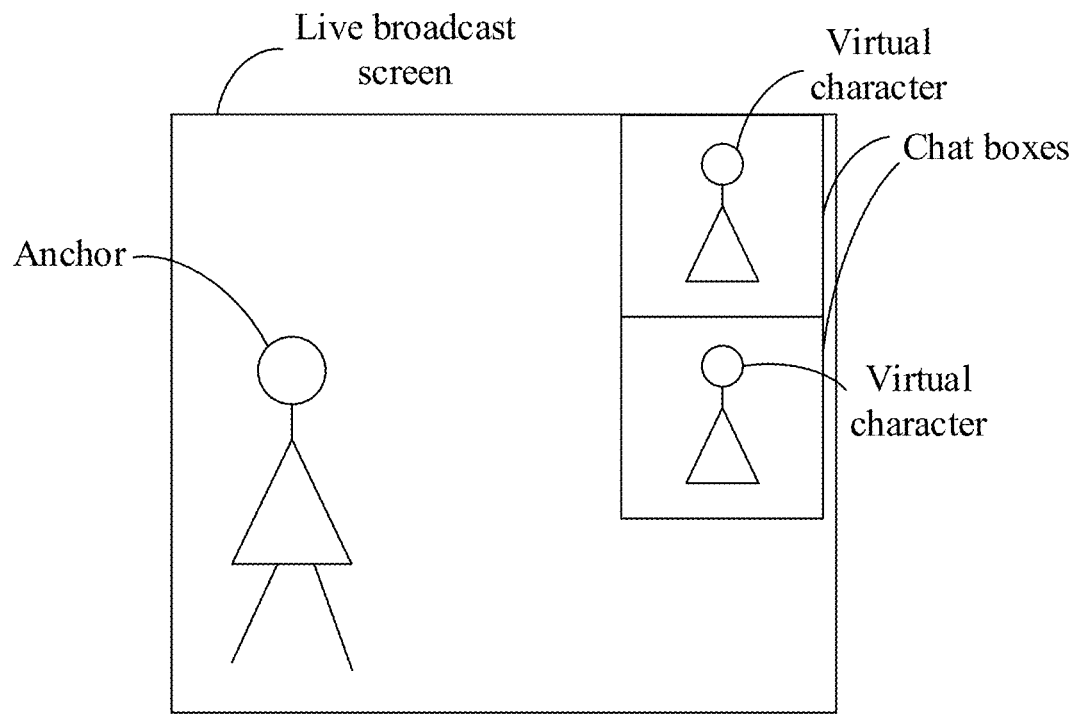
FIG. 3 is a scene diagram of a chat between an anchor and a virtual character according to an embodiment of the present disclosure.

FIGS. 2 and 3 are scene diagrams of a chat between an anchor and a virtual character according to an embodiment of the present disclosure. As shown in FIG. 2, the virtual character acts as an assistant and chats with the anchor in the same live broadcast room, and the virtual character and the anchor are in the same screen and there is no chat box. As shown in FIG. 3, the virtual characters, as audiences or anchors in other live broadcast rooms, exist in different chat boxes from the anchor in this live broadcast room in the live broadcast screen. Of course, the real audiences or other anchors may also exist in the live broadcast screen in the form of chat boxes together with the chat boxes of the virtual characters in FIG. 3.

According to the above implementation, the virtual characters are set for the anchor in the live broadcast room, the speech recognition is performed on the live speech of the anchor to obtain the first text information, and then the topic popularity of the live broadcast can be determined based on the audience response information and the first text information. When determining that the anchor has nothing to talk about through the topic popularity of the live broadcast, the first text information is used to determine the corresponding reply text information, and the reply text information is used to render the virtual characters to obtain the second video stream; and the first video stream obtained by recording the live broadcast of the anchor is mixed with the second video stream to generate the third video stream of the anchor chatting with the virtual characters, thereby realizing a live broadcast scene in which the virtual characters interact on topics with the anchor. In this way, when the anchor has nothing to talk about, the virtual character can find topics to chat with the anchor, to liven up the atmosphere of the live broadcast room and increase the topic popularity of the live broadcast.

In one implementation, the step of determining topic popularity of the live broadcast based on audience response information in a process of recording the live broadcast and the first text information, includes: extracting at least one first text segment from the first text information; for each first text segment, searching the audience response information for a second text segment that can form a key-value pair with the first text segment, and counting the number of key-value pairs; and determining the topic popularity of the live broadcast based on the number of key-value pairs.

It can be understood that the first text segment may be a text segment serving as key information, for example, a question sentence or a declarative sentence, etc.

It can be understood that the second text segment may be a text segment serving as value information, for example, an answer sentence or a rhetorical question sentence, etc.

It can be understood that the audience response information may include the second text segment that forms a key-value pair with the first text segment, or may not include the second text segment that forms a key-value pair with the first text segment.

Exemplarily, each text segment in the audience response information includes a timestamp, and each text segment in the first text information also has a timestamp. For a first text segment, a second text segment that forms a key-value pair with the first text segment and has a timestamp matching with the timestamp of the first text segment is searched in the audience response information. Here, the two timestamps matching with each other may be two timestamps within the same time range.

Exemplarily, a key-value pair database is preset, and a target key-value pair is searched in the key-value pair database using a first text segment, where the target key-value pair includes the first text segment and a third text segment. The third text segment is extracted from the target key-value pair, and then a second text segment identical or similar to the third text segment is searched in the audience response information. Finally, the first text segment and the second text segment are combined into a new key-value pair.

It can be understood that the more newly formed key-value pairs there are, the higher the topic popularity of the live broadcast will be. For example, a linear function may be used to calculate the number of key-value pairs to obtain the topic popularity of the live broadcast.

According to the above implementation, the topic popularity of the live broadcast can be accurately determined by utilizing the number of key-value pairs consisting of the text segments in the first text information and the text segments in the audience response information from the live speech.

In one implementation, the step of determining corresponding reply text information based on the first text information when the topic popularity of the live broadcast meets a first set condition, includes: extracting keywords from the first text information to obtain a plurality of keywords when the topic popularity of the live broadcast meets the first set condition; performing topic classification on the plurality of keywords to obtain at least one topic set; determining a topic repetition degree of the live broadcast based on the number of topic sets; and determining the corresponding reply text information based on the first text information when the topic repetition degree of the live broadcast meets a second set condition.

Exemplarily, when the topic popularity of the live broadcast does not meet the first set condition or when the topic popularity of the live broadcast meets the first set condition and the topic repetition degree of the live broadcast does not meet the second set condition, meaning that the anchor has topics to talk about and the degree of interaction with audiences is relatively high, there is no need to generate the reply text information to render the virtual characters.

It can be understood that the first set condition is that the topic popularity of the live broadcast is less than a set popularity threshold.

Exemplarily, a topic classification model may be used to classify the plurality of keywords to obtain topic types of the keywords, and then the topic types of the keywords are used to group the plurality of keywords to obtain at least one topic set. Here, the topic classification model is a model that is pre-trained based on topic data samples.

It can be understood that the greater the number of topic sets, the more topics there are in the first text information from the live speech, that is, the higher the repetition degree of the live topics of the anchor. For example, a linear function may be used to calculate the number of topic sets to obtain the topic repetition degree of the live broadcast.

It can be understood that the first text information may be processed using a text generation model to obtain the corresponding reply text information. Here, the text generation model may be a natural language processing model, for example, a large model. Here, the text generation model is a model that is pre-trained based on text data samples.

It can be understood that the second set condition is that the topic repetition degree of the live broadcast is less than a set repetition threshold.

According to the above implementation, when the topic popularity of the live broadcast is too low, the number of topics in the first text message is counted. If the number of topics is also too low, it means that the anchor has nothing to talk about, and the corresponding reply text information needs to be generated so that the virtual character and the anchor chat with each other.

In one implementation, the virtual characters include N virtual characters, N is a positive integer greater than 1, and the step of determining the corresponding reply text information based on the first text information includes: determining a corresponding target text generation model among M text generation models based on a style of a first virtual character among the N virtual characters, where M is a positive integer greater than 1; inputting the first text information into the target text generation model corresponding to the first virtual character to obtain reply text information of the first virtual character; for an $i^{th}$ virtual character among the N virtual characters, performing operations of: determining a corresponding target text generation model among the M text generation models based on a style of the $i^{th}$ virtual character, where i is a positive integer greater than 1; and inputting the first text information and reply text information of the first virtual character to an $i-1^{th}$ virtual character into the target text generation model corresponding to the $i^{th}$ virtual character to obtain reply text information of the $i^{th}$ virtual character.

It can be understood that the value of N may be the same as or different from the value of M.

It can be understood that the styles of the N virtual characters are different, or some of the virtual characters may have the same style.

Exemplarily, the styles of the virtual characters may be styles of roles such as news anchor, entertainment anchor, reporter, audience, etc. The styles of the virtual characters may also be male, female, child, elementary school student, middle school student and other styles.

Exemplarily, the number of virtual characters and the style of each virtual character may be set by the anchor in the virtual character setting interface. Alternatively, the number of virtual characters and the style of each virtual character may be set accordingly based on the live broadcast content of the live broadcast room.

It can be understood that any two virtual characters with different styles correspond to different target text generation models, and any two virtual characters with the same style correspond to the same target text generation model.

It can be understood that the styles corresponding to the above M text generation models are different. Each text generation model is a model that is trained using the text data samples with the corresponding style.

Exemplarily, starting from the initial value of i being 2, for the $i^{th}$ virtual character among the N virtual characters, the following operations are performed separately: determining a corresponding target text generation model among the M text generation models based on a style of the $i^{th}$ virtual character, where i is a positive integer greater than 1; and inputting the first text information and reply text information of the first virtual character to an $i-1^{th}$ virtual character into the target text generation model corresponding to the $i^{th}$ virtual character to obtain reply text information of the $i^{th}$ virtual character.

Here, when the initial value of i is 2, the first text information and the reply text information of the first virtual character are input into the target text generation model corresponding to the second virtual character to obtain the reply text information of the second virtual character.

In actual applications, if there are a plurality of virtual characters chatting with the anchor at the same time, it is necessary to consider whether the chat content between each virtual character and the anchor can be connected and follow each other.

Therefore, in this example, the reply text information of the next virtual character is generated based on the first text information spoken by the anchor and the reply text information of all the virtual characters that has been generated, so that the chat content between each virtual character and the anchor can be connected and follow each other.

In some embodiments, the reply text information of the next virtual character may also be generated based on only the reply text information of the previous virtual character, or the reply text information of the next virtual character may be generated based on the first text information and the reply text information of the previous virtual character.

Exemplarily, the step of determining the corresponding reply text information based on the first text information includes: determining a corresponding target text generation model among M text generation models based on a style of a first virtual character among the N virtual characters; inputting the first text information into the target text generation model corresponding to the first virtual character to obtain reply text information of the first virtual character; starting from the initial value of i being 2, performing the following operations on the $i^{th}$ virtual character among the N virtual characters: determining a corresponding target text generation model among the M text generation models based on a style of the $i^{th}$ virtual character; and inputting the reply text information of the $i-1^{th}$ virtual character into the target text generation model corresponding to the $i^{th}$ virtual character to obtain the reply text information of the $i^{th}$ virtual character.

Exemplarily, the step of determining the corresponding reply text information based on the first text information includes: determining a corresponding target text generation model among M text generation models based on a style of a first virtual character among the N virtual characters; inputting the first text information into the target text generation model corresponding to the first virtual character to obtain reply text information of the first virtual character; starting from the initial value of i being 2, performing the following operations on the $i^{th}$ virtual character among the N virtual characters: determining a corresponding target text generation model among the M text generation models based on a style of the $i^{th}$ virtual character; and inputting the first text information and the reply text information of the $i-1^{th}$ virtual character into the target text generation model corresponding to the $i^{th}$ virtual character to obtain the reply text information of the $i^{th}$ virtual character.

According to the above implementation, the reply text information of the next virtual character is generated based on the first text information spoken by the anchor and/or the reply text information of one or more virtual characters that has been generated, so that the chat content between each virtual character and the anchor can be connected and follow each other.

In one implementation, the step of rendering the virtual characters based on the reply text information to obtain a second video stream, includes: rendering each virtual character based on the reply text information of each virtual character to obtain a second video stream of each virtual character.

It can be understood that each virtual character may be a virtual character with a corresponding style. For example, the anchor selects a virtual character with a first style in a style selection interface, uses the model data of the virtual character with the first style to start rendering, and obtains an initial video stream of the virtual character of the first network, where the initial video stream includes an initial picture and an initial voice.

It can be understood that the virtual character in the initial video stream of each virtual character is rendered based on the reply text information of each virtual character, to obtain the second video stream of each virtual character. For example, the reply text information is used to determine the corresponding lip shape data and body movement data, and the lip shape data and body movement data are used to adjust the lip shape and body movement of the virtual character in the initial video stream, so that the lip shape of the virtual character matches with the lip shape in the lip shape data, and the body movement of the virtual character matches with the body movement in the body movement data.

According to the above implementation, when a plurality of virtual characters exist, the reply text information of each virtual character is used to render each virtual character separately to obtain the second video stream of each virtual character, facilitating subsequent stream mixing.

In one implementation, the step of generating a third video stream of the anchor chatting with the virtual characters based on the first video stream and the second video stream, includes: mixing the first video stream with the second video stream of each virtual character based on a generation order of the reply text information of the virtual characters, to obtain a third video stream of the anchor chatting with each virtual character.

It can be understood that the above order of generating the reply text information of the N virtual characters is the same as the order of arranging the N virtual characters, subject to the above arrangement i.

Exemplarily, the first video stream is mixed with the second video stream of the first virtual character among the N virtual characters to obtain a first stream mixing result; and starting from the initial value of i being 2, for the $i^{th}$ virtual character among the N virtual characters, the $i-1^{th}$ stream mixing result is mixed with the second video stream of the $i^{th}$ virtual character to obtain the $i^{th}$ stream mixing result. Finally, the $N^{th}$ stream mixing result is used as the third video stream of the anchor chatting with each virtual character.

Here, each stream mixing result is a video stream.

It can be understood that the stream mixing is to insert one or more video frames in one video stream between two video frames in another video stream, or splice one or more video frames in one video stream with one or more video frames in another video stream.

In actual applications, if there are a plurality of virtual characters chatting with the anchor at the same time, the order in which the virtual characters chat with the anchor needs to be considered to avoid the plurality of virtual characters from talking at the same time.

Therefore, the above implementation can avoid the plurality of virtual characters from chatting with the anchor at the same time, and avoid the situation of too confused voice.

In one implementation, the step of determining the corresponding reply text information based on the first text information includes: processing the first text information based on styles of the virtual characters to obtain second text information; and processing the second text information based on a text generation model to obtain the reply text information of the virtual characters.

In actual applications, only one virtual character may be set to chat with the anchor, and the style of the virtual character may be set by the anchor or may be automatically set according to the live broadcast content. A plurality of virtual characters with different styles may be set to chat with the anchor. Simultaneously, only one text generation model may be set, or a plurality of text generation models may be set. These text generation models may be large language models.

It can be understood that the second text information is the stylized first text information.

In this example, before the first text information is input into the text generation model, the first text information is stylized and then input into the text generation model. In this way, the reply text information with different styles can be generated using only one text generation model.

Figure 4:
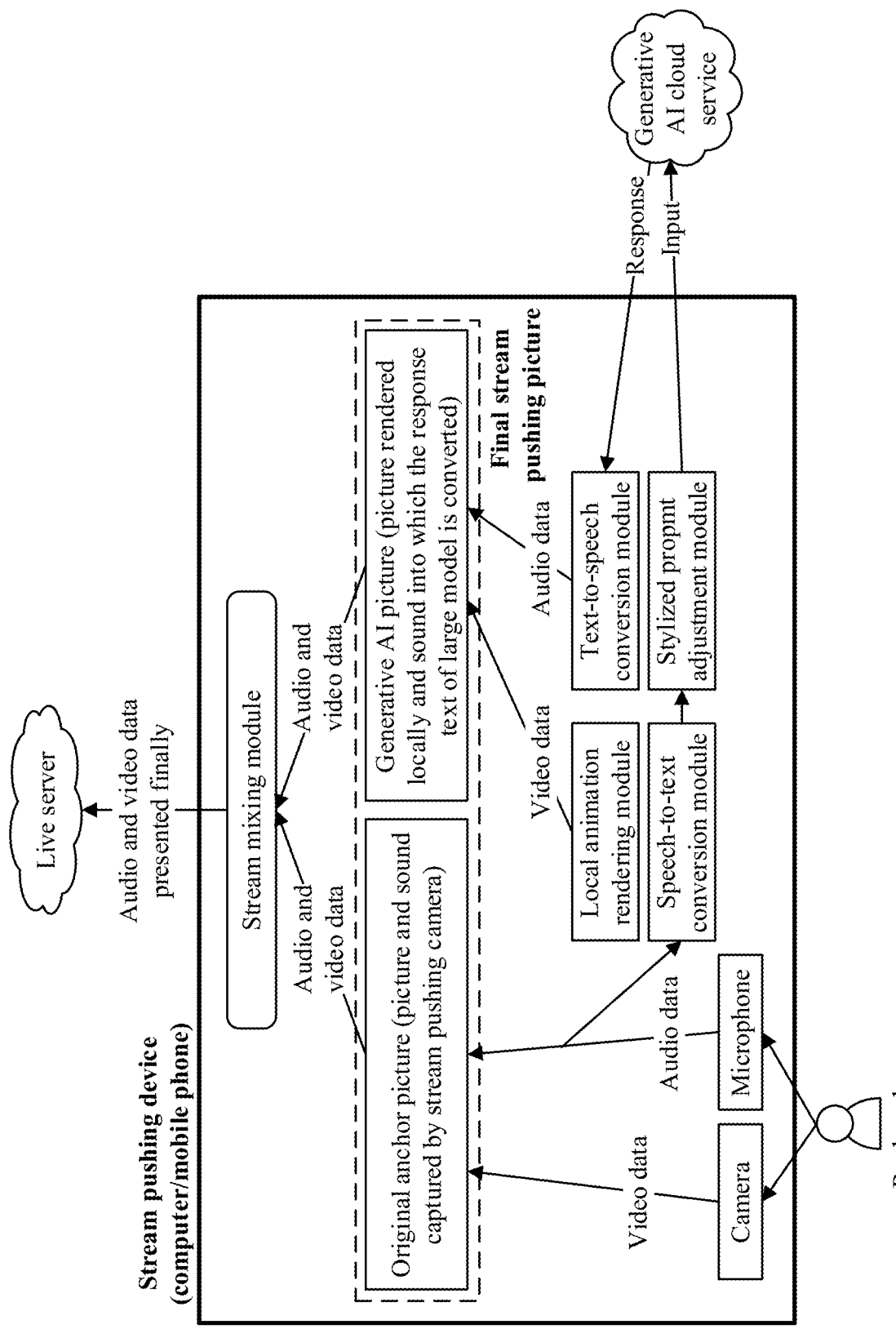
FIG. 4 is a schematic diagram of a live chat method according to an embodiment of the present disclosure.

FIG. 4 is a schematic diagram of a live chat method according to an embodiment of the present disclosure.

As shown in FIG. 4, under normal circumstances, the pictures come from a camera of the stream pushing device (computer/mobile phone) used and the sounds come from a microphone of the streaming pushing device used during stream pushing of the live broadcast. The speech data of the anchor in stream pushing of the live broadcast is sent to the speech recognition module (deployed locally or implemented by cloud service) to convert the words spoken by the anchor into text. Then, the text is converted into one piece of reasonable text information through the propmt (text) stylized module. Here, the specific style depends on the anchor's requirement and may be configured by the anchor. The stylized text information is input into the large model (generative AI) service in the cloud to obtain the response text provided by the large model. The response text is converted into speech locally and merged with a local rendered picture, such as a picture of a cartoon character opening and closing his mouth, into a generative AI response picture. The anchor's own captured picture and the generative AI response picture are mixed into a live stream, and the live stream is pushed to a live server for viewers to consume.

Figure 5:
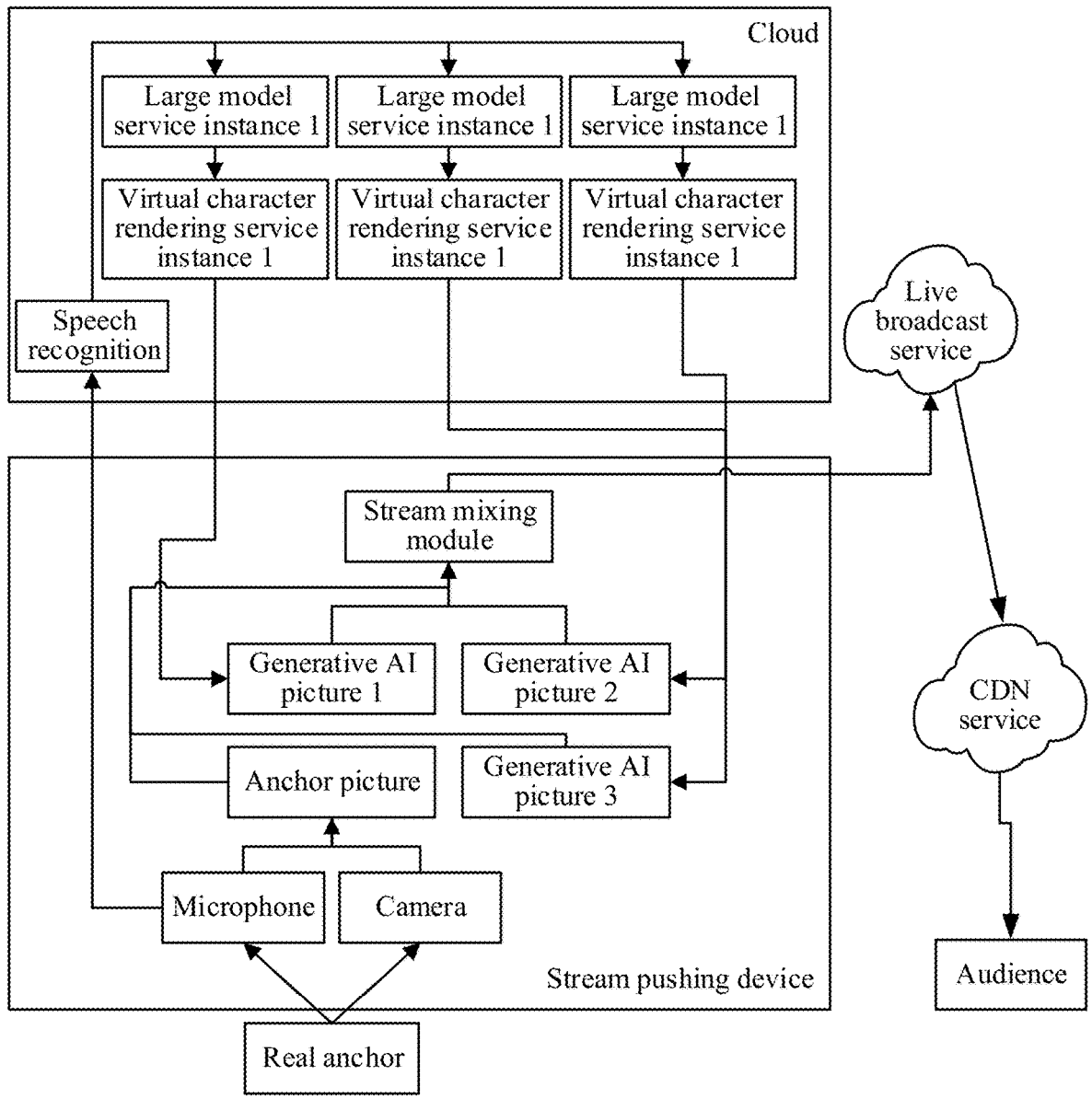
FIG. 5 is a schematic diagram of a live microphone chatting method according to an embodiment of the present disclosure.

FIG. 5 is a schematic diagram of a live microphone chatting method according to an embodiment of the present disclosure.

The anchor selects a digital human with the corresponding style in advance based on the requirement of his/her own live content. After the selection, the cloud will create the corresponding digital human rendering instance and large model inference instance while performing some stylized initialization settings, and simultaneously start rendering the digital human picture and corresponding audio. When the anchor is live streaming in real time, the stream pushing device will pull the digital human picture rendered by the cloud from the cloud. When the anchor needs to interact, he/she will speak to the stream pushing device, and his/she speech signal will be copied and uploaded to the cloud for speech-to-text conversion to obtain the corresponding text. At the same time, the text is input into different large model inference instances. After different large models generate reply texts with different styles, the reply texts will be input into the digital human rendering instance to render the corresponding speaking pictures and sounds. The rendered pictures are pulled by the stream pushing device in real time. The stream pushing device mixes the pictures and sounds of the real anchor with the sounds on the digital human picture in the cloud into a video and audio stream, and pushes it to the live broadcast service, for audiences to watch after being distributed by CDN.

Figure 6:
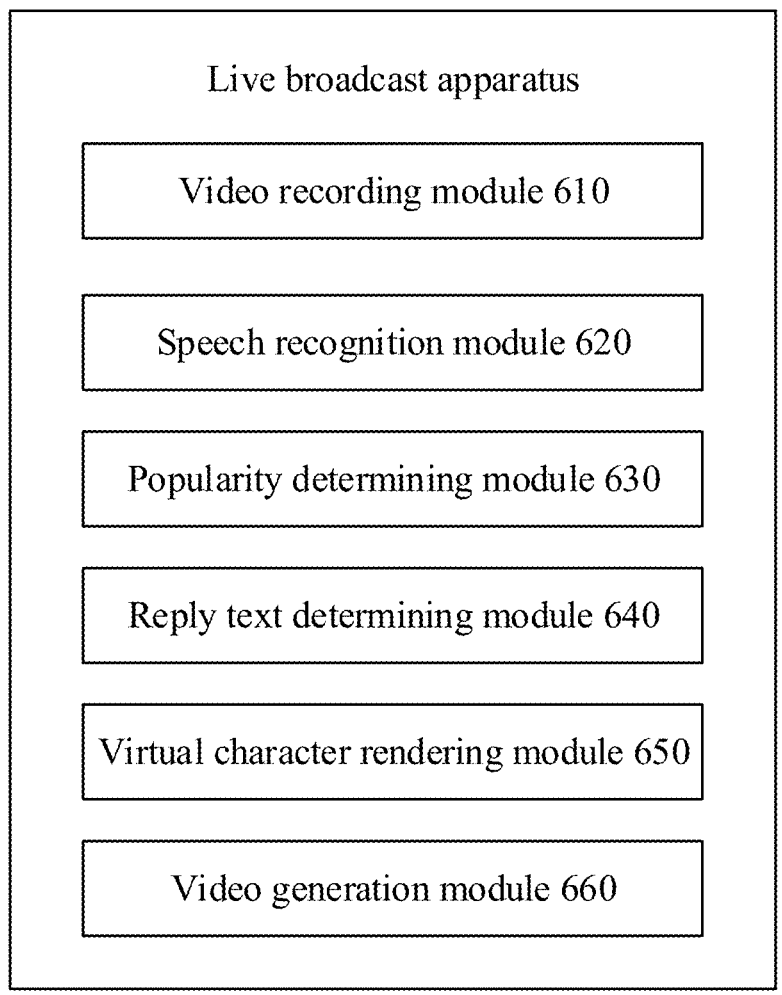
FIG. 6 is a structural block diagram of a live broadcast apparatus according to an embodiment of the present disclosure.

FIG. 6 is a structural block diagram of a live broadcast apparatus according to an embodiment of the present disclosure.

As shown in FIG. 6, the live broadcast apparatus may include:

a video recording module 610 configured to record a live broadcast of an anchor to obtain a first video stream;

a speech recognition module 620 configured to perform speech recognition on live speech in the first video stream to obtain first text information;

a popularity determining module 630 configured to determine topic popularity of the live broadcast based on audience response information in a process of recording the live broadcast and the first text information;

a reply text determining module 640 configured to determine corresponding reply text information based on the first text information when the topic popularity of the live broadcast meets a first set condition;

a virtual character rendering module 650 configured to render virtual characters based on the reply text information to obtain a second video stream; and a video generation module 660 configured to generate a third video stream of the anchor chatting with the virtual characters based on the first video stream and the second video stream.

Figure 7:
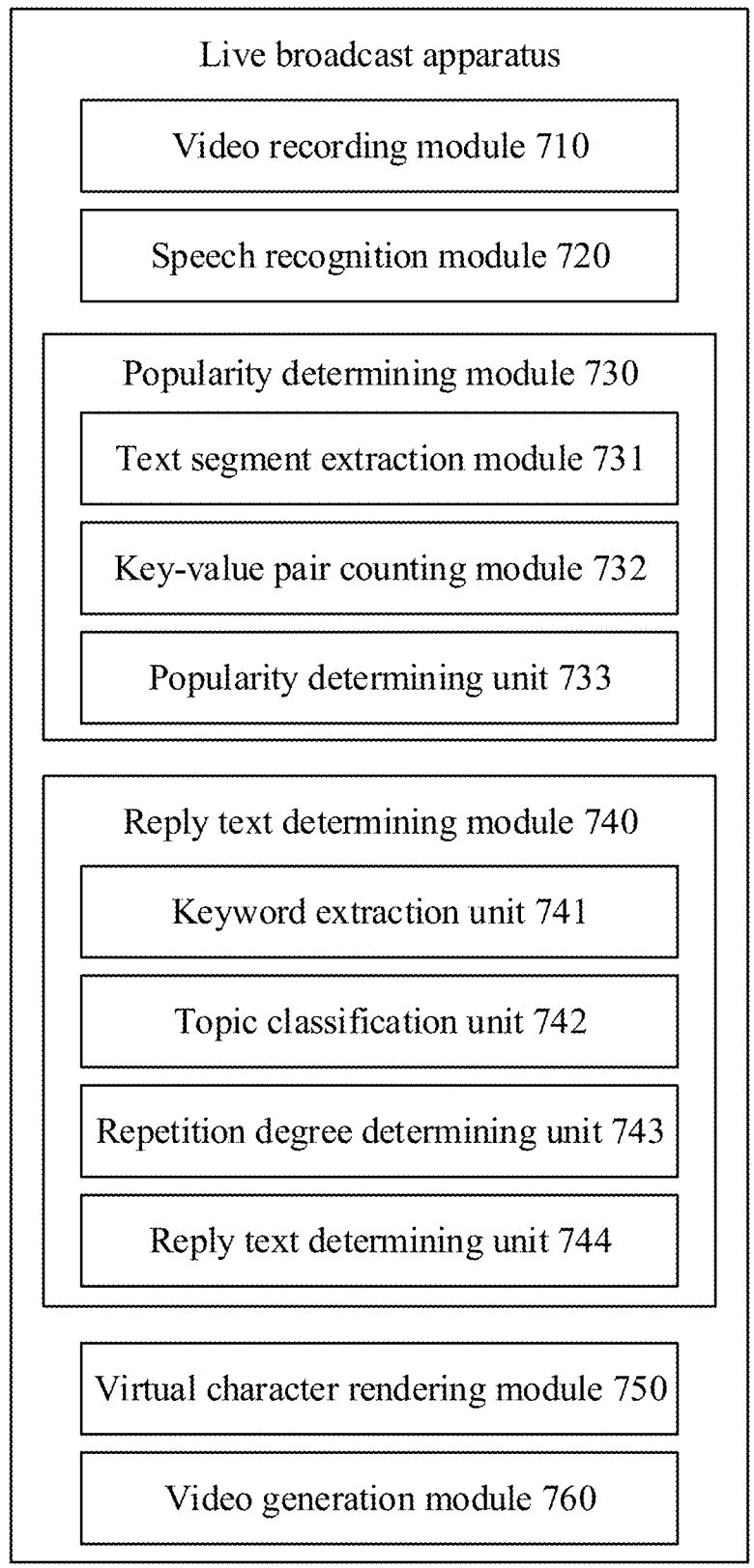
FIG. 7 is a structural block diagram of a live broadcast apparatus according to another embodiment of the present disclosure.

FIG. 7 is a structural block diagram of a live broadcast apparatus according to another embodiment of the present disclosure. The video recording module 710, speech recognition module 720, popularity determining module 730, reply text determining module 740, virtual character rendering module 750 and video generation module 760 in FIG. 7 have the same structures and functions as the video recording module 610, speech recognition module 620, popularity determining module 630, reply text determining module 640, virtual character rendering module 650 and video generation module 660 in FIG. 6, and will not be described in detail here.

In one implementation, the popularity determining module 730 includes:

a text segment extraction module 731 configured to extract at least one first text segment from the first text information;

a key-value pair counting module 732 configured to, for each first text segment, search the audience response information for a second text segment that can form a key-value pair with the first text segment, and count the number of key-value pairs; and a popularity determining unit 733 configured to determine the topic popularity of the live broadcast based on the number of key-value pairs.

In one implementation, the reply text determining module 740 includes:

a keyword extraction unit 741 configured to extract keywords from the first text information to obtain a plurality of keywords when the topic popularity of the live broadcast meets the first set condition;

a topic classification unit 742 configured to perform topic classification on the plurality of keywords to obtain at least one topic set;

a repetition degree determining unit 743 configured to determine a topic repetition degree of the live broadcast based on the number of topic sets; and a reply text determining unit 744 configured to determine the corresponding reply text information based on the first text information when the topic repetition degree of the live broadcast meets a second set condition.

In one implementation, the virtual characters include N virtual characters, N is a positive integer greater than 1, and the reply text determining unit is specifically configured to:

determine a corresponding target text generation model among M text generation models based on a style of a first virtual character among the N virtual characters, where M is a positive integer greater than 1;

input the first text information into the target text generation model corresponding to the first virtual character to obtain reply text information of the first virtual character;

for an $i^{th}$ virtual character among the N virtual characters, perform operations of:

determining a corresponding target text generation model among the M text generation models based on a style of the $i^{th}$ virtual character, where i is a positive integer greater than 1; and inputting the first text information and reply text information of the first virtual character to an $i-1^{th}$ virtual character into the target text generation model corresponding to the $i^{th}$ virtual character to obtain reply text information of the $i^{th}$ virtual character.

In one implementation, the virtual character rendering module is specifically configured to:

render each virtual character based on the reply text information of each virtual character to obtain a second video stream of each virtual character.

In one implementation, the video generation module is specifically configured to:

mix the first video stream with the second video stream of each virtual character based on a generation order of the reply text information of the virtual characters, to obtain a third video stream of the anchor chatting with each virtual character.

In one implementation, the reply text determining unit is specifically configured to:

process the first text information based on styles of the virtual characters to obtain second text information; and process the second text information based on a text generation model to obtain the reply text information of the virtual characters.

For the description of specific functions and examples of the modules and sub-modules of the apparatus of the embodiment of the present disclosure, reference may be made to the relevant description of the corresponding steps in the above-mentioned method embodiments, and details are not repeated here.

In the technical solution of the present disclosure, the acquisition, storage and application of the user's personal information involved are in compliance with relevant laws and regulations, and do not violate public order and good customs.

According to the embodiments of the present disclosure, the present disclosure also provides an electronic device, a readable storage medium and a computer program product.

Figure 8:
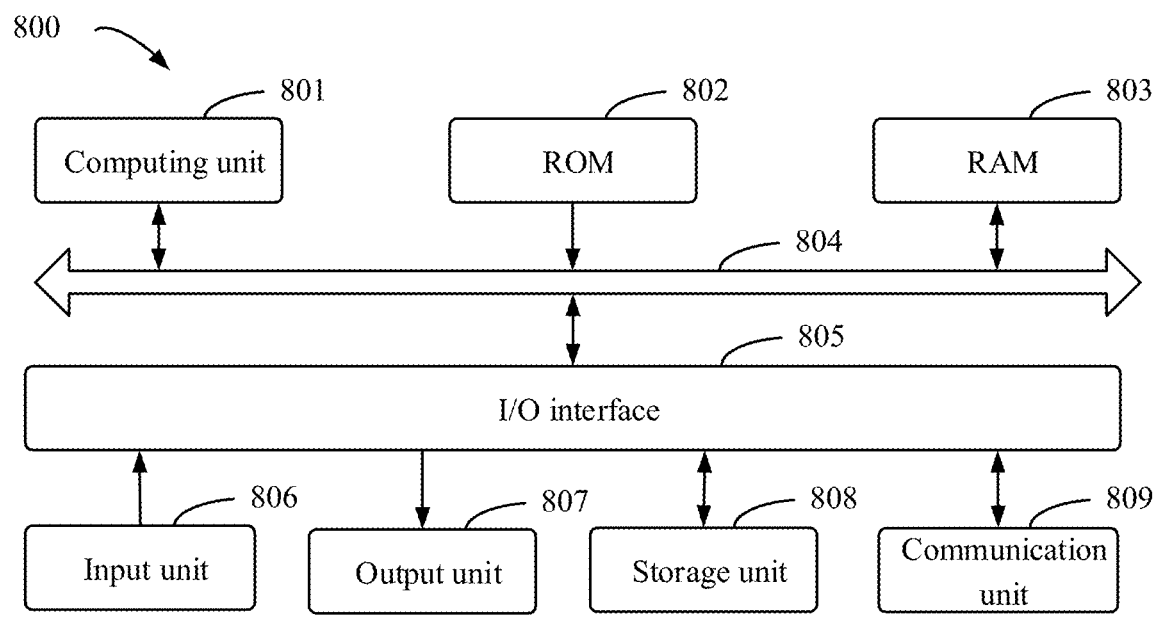
FIG. 8 is a block diagram of an electronic device according to an embodiment of the present disclosure.

FIG. 8 shows a schematic block diagram of an exemplary electronic device 800 that may be used to implement the embodiments of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital assistant, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 8, the device 800 includes a computing unit 801 that may perform various appropriate actions and processes according to a computer program stored in a Read-Only Memory (ROM) 802 or a computer program loaded from a storage unit 808 into a Random Access Memory (RAM) 803. Various programs and data required for an operation of device 800 may also be stored in the RAM 803. The computing unit 801, the ROM 802 and the RAM 803 are connected to each other through a bus 804. The input/output (I/O) interface 805 is also connected to the bus 804.

A plurality of components in the device 800 are connected to the I/O interface 805, and include an input unit 806 such as a keyboard, a mouse, or the like; an output unit 807 such as various types of displays, speakers, or the like; the storage unit 808 such as a magnetic disk, an optical disk, or the like; and a communication unit 809 such as a network card, a modem, a wireless communication transceiver, or the like. The communication unit 809 allows the device 800 to exchange information/data with other devices through a computer network such as the Internet and/or various telecommunication networks.

The computing unit 801 may be various general-purpose and/or special-purpose processing components with processing and computing capabilities. Some examples of the computing unit 801 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 801 performs the various methods and processes described above, such as a video rendering method for a live broadcast scene. For example, in some implementations, the video rendering method for the live broadcast scene may be implemented as a computer software program tangibly contained in a computer-readable medium, such as the storage unit 808. In some implementations, a part or all of the computer program may be loaded and/or installed on the device 800 via the ROM 802 and/or the communication unit 809. When the computer program is loaded into the RAM 803 and executed by the computing unit 801, one or more steps of the video rendering method for the live broadcast scene described above may be performed. Alternatively, in other implementations, the computing unit 801 may be configured to perform the video rendering method for the live broadcast scene by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), an Application Specific Standard Product (ASSP), a System on Chip (SOC), a Complex Programmable Logic Device (CPLD), a computer hardware, firmware, software, and/or a combination thereof. These various implementations may be implemented in one or more computer programs, and the one or more computer programs may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a Cathode Ray Tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a blockchain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the principle of the present disclosure shall be included in the protection scope of the present disclosure.

What is claimed is:

1. A video rendering method for a live broadcast scene, comprising:
   recording a live broadcast of an anchor to obtain a first video stream;
   performing speech recognition on live speech in the first video stream to obtain first text information;
   determining topic popularity of the live broadcast based on audience response information in a process of recording the live broadcast and the first text information;
   determining corresponding reply text information based on the first text information when the topic popularity of the live broadcast meets a first set condition;
   rendering virtual characters based on the reply text information to obtain a second video stream; and
   generating a third video stream of the anchor chatting with the virtual characters based on the first video stream and the second video stream.

2. The method of claim 1, wherein the determining topic popularity of the live broadcast based on audience response information in a process of recording the live broadcast and the first text information, comprises:
   extracting at least one first text segment from the first text information;
   for each first text segment, searching the audience response information for a second text segment that can form a key-value pair with the first text segment, and counting the number of key-value pairs; and
   determining the topic popularity of the live broadcast based on the number of key-value pairs.

3. The method of claim 1, wherein the determining corresponding reply text information based on the first text information when the topic popularity of the live broadcast meets a first set condition, comprises:
   extracting keywords from the first text information to obtain a plurality of keywords when the topic popularity of the live broadcast meets the first set condition;
   performing topic classification on the plurality of keywords to obtain at least one topic set;
   determining a topic repetition degree of the live broadcast based on the number of topic sets; and
   determining the corresponding reply text information based on the first text information when the topic repetition degree of the live broadcast meets a second set condition.

4. The method of claim 1, wherein the virtual characters comprise N virtual characters, N is a positive integer greater than 1, and the determining the corresponding reply text information based on the first text information comprises:
   determining a corresponding target text generation model among M text generation models based on a style of a first virtual character among the N virtual characters, wherein M is a positive integer greater than 1;
   inputting the first text information into the target text generation model corresponding to the first virtual character to obtain reply text information of the first virtual character;
   for an $i^{th}$ virtual character among the N virtual characters, performing operations of:
   determining a corresponding target text generation model among the M text generation models based on a style of the $i^{th}$ virtual character, wherein i is a positive integer greater than 1; and
   inputting the first text information and reply text information of the first virtual character to an $i-1^{th}$ virtual character into the target text generation model corresponding to the $i^{th}$ virtual character to obtain reply text information of the $i^{th}$ virtual character.

5. The method of claim 4, wherein the rendering the virtual characters based on the reply text information to obtain a second video stream, comprises:
   rendering each virtual character based on the reply text information of each virtual character to obtain a second video stream of each virtual character.

6. The method of claim 5, wherein the generating a third video stream of the anchor chatting with the virtual characters based on the first video stream and the second video stream, comprises:
   mixing the first video stream with the second video stream of each virtual character based on a generation order of the reply text information of the virtual characters, to obtain a third video stream of the anchor chatting with each virtual character.

7. The method of claim 1, wherein the determining the corresponding reply text information based on the first text information, comprises:
   processing the first text information based on styles of the virtual characters to obtain second text information; and
   processing the second text information based on a text generation model to obtain the reply text information of the virtual characters.

8. An electronic device, comprising:
   at least one processor; and
   a memory connected in communication with the at least one processor,
   wherein the memory stores an instruction executable by the at least one processor, and the instruction, when executed by the at least one processor, enables the at least one processor to execute:
   recording a live broadcast of an anchor to obtain a first video stream;
   performing speech recognition on live speech in the first video stream to obtain first text information;
   determining topic popularity of the live broadcast based on audience response information in a process of recording the live broadcast and the first text information;
   determining corresponding reply text information based on the first text information when the topic popularity of the live broadcast meets a first set condition;
   rendering virtual characters based on the reply text information to obtain a second video stream; and
   generating a third video stream of the anchor chatting with the virtual characters based on the first video stream and the second video stream.

9. A non-transitory computer-readable storage medium storing a computer instruction thereon, wherein the computer instruction is used to cause a computer to execute:
   recording a live broadcast of an anchor to obtain a first video stream;
   performing speech recognition on live speech in the first video stream to obtain first text information;

determining topic popularity of the live broadcast based on audience response information in a process of recording the live broadcast and the first text information;

determining corresponding reply text information based on the first text information when the topic popularity of the live broadcast meets a first set condition;

rendering virtual characters based on the reply text information to obtain a second video stream; and generating a third video stream of the anchor chatting with the virtual characters based on the first video stream and the second video stream.

10. The electronic device of claim 8, wherein the determining topic popularity of the live broadcast based on audience response information in a process of recording the live broadcast and the first text information, comprises:

extracting at least one first text segment from the first text information;

for each first text segment, searching the audience response information for a second text segment that can form a key-value pair with the first text segment, and counting the number of key-value pairs; and determining the topic popularity of the live broadcast based on the number of key-value pairs.

11. The electronic device of claim 8, wherein the determining corresponding reply text information based on the first text information when the topic popularity of the live broadcast meets a first set condition, comprises:

extracting keywords from the first text information to obtain a plurality of keywords when the topic popularity of the live broadcast meets the first set condition;

performing topic classification on the plurality of keywords to obtain at least one topic set;

determining a topic repetition degree of the live broadcast based on the number of topic sets; and determining the corresponding reply text information based on the first text information when the topic repetition degree of the live broadcast meets a second set condition.

12. The electronic device of claim 8, wherein the virtual characters comprise N virtual characters, N is a positive integer greater than 1, and the determining the corresponding reply text information based on the first text information comprises:

determining a corresponding target text generation model among M text generation models based on a style of a first virtual character among the N virtual characters, wherein M is a positive integer greater than 1;

inputting the first text information into the target text generation model corresponding to the first virtual character to obtain reply text information of the first virtual character;

for an $i^{th}$ virtual character among the N virtual characters, performing operations of:

determining a corresponding target text generation model among the M text generation models based on a style of the $i^{th}$ virtual character, wherein i is a positive integer greater than 1; and inputting the first text information and reply text information of the first virtual character to an $i-1^{th}$ virtual character into the target text generation model corresponding to the $i^{th}$ virtual character to obtain reply text information of the $i^{th}$ virtual character.

13. The electronic device of claim 12, wherein the rendering the virtual characters based on the reply text information to obtain a second video stream, comprises:

rendering each virtual character based on the reply text information of each virtual character to obtain a second video stream of each virtual character.

14. The electronic device of claim 13, wherein the generating a third video stream of the anchor chatting with the virtual characters based on the first video stream and the second video stream, comprises:

mixing the first video stream with the second video stream of each virtual character based on a generation order of the reply text information of the virtual characters, to obtain a third video stream of the anchor chatting with each virtual character.

15. The electronic device of claim 8, wherein the determining the corresponding reply text information based on the first text information, comprises:

processing the first text information based on styles of the virtual characters to obtain second text information; and processing the second text information based on a text generation model to obtain the reply text information of the virtual characters.

16. The non-transitory computer-readable storage medium of claim 9, wherein the determining topic popularity of the live broadcast based on audience response information in a process of recording the live broadcast and the first text information, comprises:

extracting at least one first text segment from the first text information;

for each first text segment, searching the audience response information for a second text segment that can form a key-value pair with the first text segment, and counting the number of key-value pairs; and determining the topic popularity of the live broadcast based on the number of key-value pairs.

17. The non-transitory computer-readable storage medium of claim 9, wherein the determining corresponding reply text information based on the first text information when the topic popularity of the live broadcast meets a first set condition, comprises:

extracting keywords from the first text information to obtain a plurality of keywords when the topic popularity of the live broadcast meets the first set condition;

performing topic classification on the plurality of keywords to obtain at least one topic set;

determining a topic repetition degree of the live broadcast based on the number of topic sets; and determining the corresponding reply text information based on the first text information when the topic repetition degree of the live broadcast meets a second set condition.

18. The non-transitory computer-readable storage medium of claim 9, wherein the virtual characters comprise N virtual characters, N is a positive integer greater than 1, and the determining the corresponding reply text information based on the first text information comprises:

determining a corresponding target text generation model among M text generation models based on a style of a first virtual character among the N virtual characters, wherein M is a positive integer greater than 1;

inputting the first text information into the target text generation model corresponding to the first virtual character to obtain reply text information of the first virtual character;

for an $i^{th}$ virtual character among the N virtual characters, performing operations of:

determining a corresponding target text generation model among the M text generation models based on a style of the $i^{th}$ virtual character, wherein i is a positive integer greater than 1; and inputting the first text information and reply text information of the first virtual character to an $i-1^{th}$ virtual character into the target text generation model corresponding to the $i^{th}$ virtual character to obtain reply text information of the $i^{th}$ virtual character.

19. The non-transitory computer-readable storage medium of claim 18, wherein the rendering the virtual characters based on the reply text information to obtain a second video stream, comprises:

rendering each virtual character based on the reply text information of each virtual character to obtain a second video stream of each virtual character.

20. The non-transitory computer-readable storage medium of claim 19, wherein the generating a third video stream of the anchor chatting with the virtual characters based on the first video stream and the second video stream, comprises:

mixing the first video stream with the second video stream of each virtual character based on a generation order of the reply text information of the virtual characters, to obtain a third video stream of the anchor chatting with each virtual character.

\* \* \* \* \*